(12) United States Patent
Ozue et al.

(10) Patent No.: US 6,229,662 B1
(45) Date of Patent: May 8, 2001

(54) MAGNETIC RECORDING/REPRODUCING APPARATUS AND MAGNETIC TAPE

(75) Inventors: Tadashi Ozue; Toshio Shirai; Yoshiteru Kamatani; Takehiko Saito, all of Kanagawa; Tomohiro Ikegami, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/225,423

(22) Filed: Jan. 5, 1999

(30) Foreign Application Priority Data

Jan. 6, 1998 (JP) .................................................. 10-001137

(51) Int. Cl.[7] ...................................................... G11B 5/02
(52) U.S. Cl. .............................. 360/55; 360/313; 360/134
(58) Field of Search .................................. 360/55, 31, 313, 360/328, 321, 322, 130.23, 134, 84

(56) References Cited

U.S. PATENT DOCUMENTS 5,995,306 * 11/1999 Contreras et al. ...................... 360/31
6,151,191 * 11/2000 Muftu et al. ...................... 360/271.5

* cited by examiner

Primary Examiner—Paul W. Huber
(74) Attorney, Agent, or Firm—Sonnenschein Nath & Rosenthal

(57) ABSTRACT

A magnetic recording/reproducing apparatus of the helical scan system employing a MR head as a reproducing magnetic head. The magnetic recording/reproducing apparatus includes a MR head 6 and a rotary drum carrying the MR head 6. In reproducing signals from the magnetic tape 7 in accordance with the helical scan system, a magnetic tape 7, having a large number of projections 7c on the tape surface and containing an electrically conductive material in its magnetic layer, is used as a recording medium.

6 Claims, 6 Drawing Sheets

MAGNETIC RECORDING/REPRODUCING APPARATUS AND MAGNETIC TAPE

BACKGROUND OF THE INVENTION

1. Field of the Invention

This invention relates to a helical scan magnetic recording/reproducing apparatus and a magnetic tape used in the helical scan magnetic recording/reproducing apparatus.

2. Description of the Related Art

In a magnetic recording/reproducing apparatus employing a magnetic tape as a recording medium, such as a video tape recorder, an audio tape recorder or a data storage system for a computer, a helical scan system is used to raise the recording density to increase the recording capacity.

For this type of the magnetic recording/reproducing apparatus, a demand is raised for further increasing the recording density and the recording capacity. To this end, there is proposed in the helical scan magnetic recording/reproducing apparatus a technique of using a magneto-resistive effect magnetic head (MR head) as a playback magnetic head.

The MR head is a magnetic head employing a magneto-resistive effect element (MR element) in its magnetically sensitive portion. It has a sensitivity higher than with an inductive magnetic head and can develop a large playback output. Thus, by using the MR head as a playback magnetic head, a higher recording density and a higher recording capacity can be realized.

However, if, in the helical scan magnetic recording/reproducing apparatus, the MR head is substituted for the inductive magnetic head for use as a playback magnetic head, a number of problems, that have not been experienced with the inductive magnetic head, are raised.

Specifically, the magnetic recording/reproducing apparatus is lowered significantly in durability such that a practically tolerable durability cannot be obtained. Moreover, there may be raised such problems as failure to output reproduced signals (dropout) notwithstanding the high playback output from the MR head.

Thus, the helical scan magnetic recording/reproducing apparatus, employing a MR head as a playback magnetic head, has much to be desired, such that a practically usable apparatus has not been realized.

SUMMARY OF THE INVENTION

It is therefore an object of the present invention to provide a magnetic recording/reproducing apparatus usable as a helical scan magnetic recording/reproducing apparatus employing a MR head as a playback magnetic head.

It is another object of the present invention to provide a magnetic tape which renders it possible to realize a helical scan magnetic recording/reproducing apparatus employing a MR head as a playback magnetic head.

In one aspect, the present invention provides a magnetic recording/reproducing apparatus for reproducing signals by a helical scan system from a magnetic tape having a magnetic layer formed on a non-magnetic substrate thereof, including a magneto-resistive effect magnetic head for reproducing signals from the magnetic tape, and a rotary drum carrying the magneto-resistive effect magnetic head, the magnetic tape being such a magnetic tape having a large number of projections on the tape surface and containing an electrically conductive material in the magnetic layer.

Since the present magnetic recording/reproducing apparatus uses a magnetic tape containing an electrically conductive material as a magnetic layer, static charges are not likely to be accumulated on the magnetic tape, so that the magnetic head is less likely to be produced due to static destruction. Also, since the present magnetic recording/reproducing apparatus uses a magnetic tape having a number of projections formed on its tape surface, the true contact area between the magnetic tape and the MR head is extremely small, so that it is unlikely that the sense current which should flow through the MR head 6 flows through the magnetic tape to produce electrical shorting.

Also, in the magnetic recording/reproducing apparatus, the magneto-resistive effect magnetic head includes a MR device as a magnetically sensitive device for detecting signals from the magnetic tape. One of the terminals derived from the MR device is preferably connected to the rotary drum. If the static electricity accumulated in the magnetic tape is discharged, any excess current produced by the discharge is allowed to exit efficiently towards the rotary drum to render destruction of the MR device less prone to destruction otherwise caused by static charges.

In another aspect, the present invention provides a magnetic tape used in a magnetic recording/reproducing apparatus adapted for reproducing signals in accordance with a helical scan system using a magneto-resistive effect magnetic head, including a tape-shaped non-magnetic substrate, and a magnetic layer formed on the non-magnetic substrate and containing an electrically conductive material, there being formed a large number of projections on a surface of the tape facing the magneto-resistive effect magnetic head.

With the present magnetic tape, in which the electrically conductive material is contained in its magnetic layer, static charges are less likely to be accumulated, so that it is unlikely that the MR head be destructed by discharge of the static charges. Also, since a number of projections are formed on the tape surface, the true contact area between the magnetic tape and the MR head is extremely small. The result is that there is only little risk of the sense current flowing in the magnetic tape instead of through the MR device to produce electrical shorting.

With the magnetic recording/reproducing apparatus according to the present invention, static destruction of the MR head can be prohibited, using the MR head of the helical scan system, to improve durability, while reducing occurrences of dropout.

With the magnetic tape of the present invention, it is possible to prevent static destruction of the MR head 6 of the magnetic recording/reproducing apparatus of the helical scan system employing a MR head as the reproducing magnetic head, to improve its durability, while reducing occurrences of dropout.

Thus, in accordance with the present invention, a MR head that is able to develop a high sensitivity and a high output can be used as a reproducing magnetic head loaded on the magnetic recording/reproducing apparatus of the helical scan system, thus assuring a higher recording density and a larger recording capacity.

DESCRIPTION OF THE PREFERRED EMBODIMENTS

Figure 1:
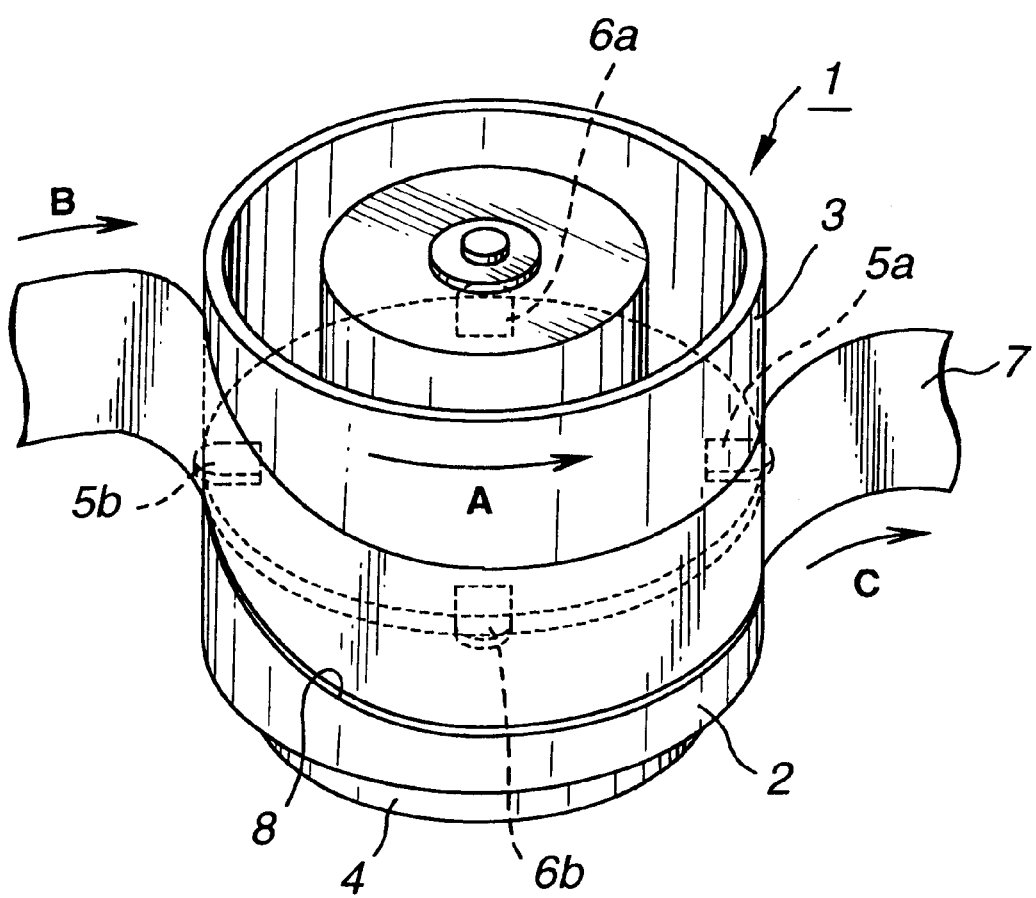
FIG. 1 is a schematic perspective view showing an illustrative structure of a rotary drum device loaded on a magnetic recording/reproducing apparatus embodying the present invention.

Referring to the drawings, preferred embodiments of the present invention will be explained in detail.

A magnetic recording/reproducing apparatus according to the present invention is such a magnetic recording/reproducing apparatus employing a magnetic tape as a recording medium, and is used as a video tape recorder, an audio tape recorder, a data storage system for computer data etc. The magnetic recording/reproducing apparatus according to the present invention is a helical scan magnetic recording/reproducing apparatus employing a rotary drum for recording/reproduction, and uses a MR head as a reproducing magnetic head loaded on a rotary drum.

Figure 2:
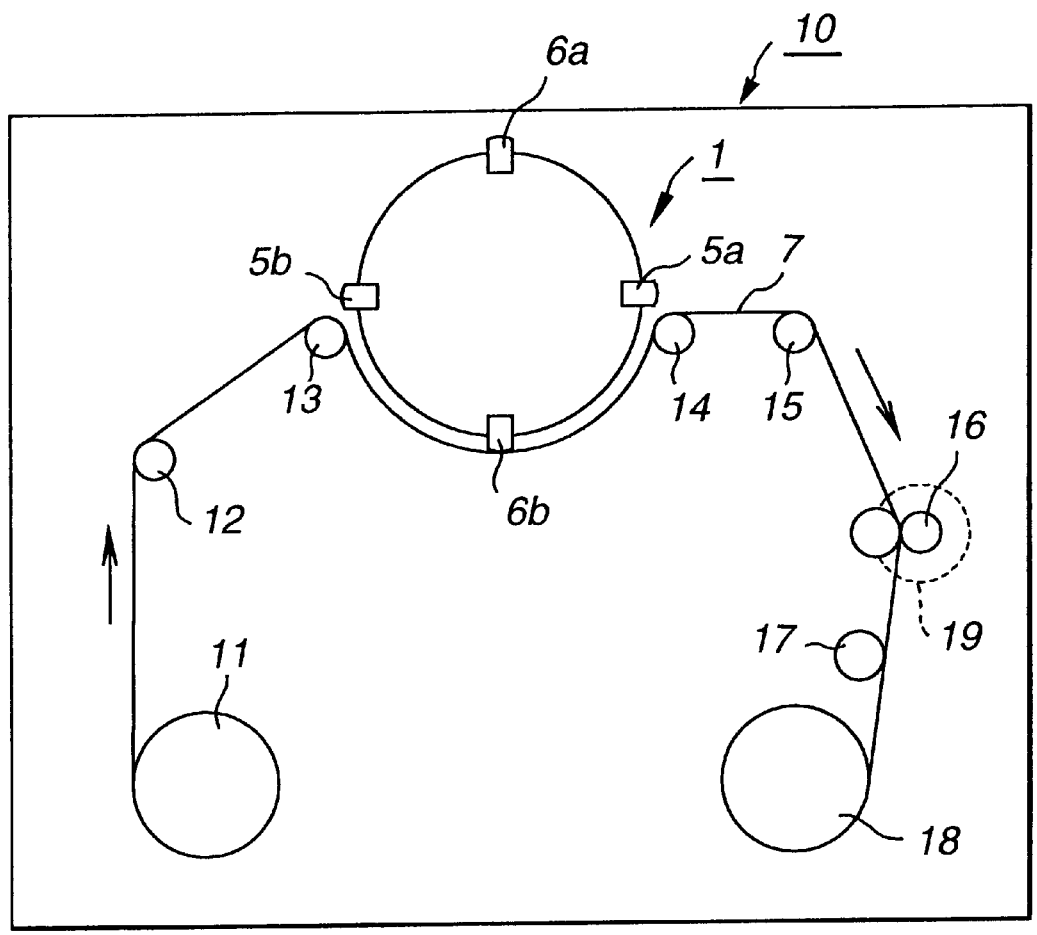
FIG. 2 is a schematic plan view showing an illustrative structure of a magnetic tape feed mechanism inclusive of the rotary drum device.

FIGS. 1 and 2 show an illustrative structure of a rotary drum device loaded on a magnetic recording/reproducing apparatus embodying the present invention. FIGS. 1 and 2 are a perspective view schematically showing a rotary drum device land a plan view showing a magnetic tape feed unit 10 inclusive of the rotary drum device 1.

Referring to FIG. 1, the rotary drum device 1 includes a cylindrically-shaped stationary drum 2, a cylindrically-shaped rotary drum 3, a motor 4 for running the rotary drum 3 in rotation, a pair of inductive magnetic heads 5a, 5b, and a pair of MR heads 6a, 6b loaded on the rotary drum 3.

The stationary drum 2 is held without performing the rotation. On a lateral side of the stationary drum 2 is formed a reel guide unit 8 for extending along the running direction of a magnetic tape 7. During recording/reproduction, this magnetic tape 7 runs along the reel guide unit 8. The rotary drum 3 is arranged so that its center axis coincides with that of the rotary drum 3.

The rotary drum 3 is a drum run in rotation at a pre-set rpm by the motor 4 during recording/reproduction for the magnetic tape 7. This rotary drum 3 is formed in a cylindrical shape of substantially the same diameter as the stationary drum 2 and is arranged so that its center axis coincides with that of the stationary drum 2. On the side of the rotary drum 3 facing the stationary drum 2 are loaded the paired inductive magnetic heads 5a, 5b and a pair of MR heads 6a, 6b.

The inductive magnetic heads 5a, 5b are recording magnetic heads in which a pair of magnetic cores are joined together with a magnetic gap in-between and in which a coil is placed around the magnetic cores. These inductive magnetic heads 5a, 5b are used for recording signals on the magnetic tape 7. The inductive magnetic heads 5a, 5b are loaded on the rotary drum 3 to define an angle of 180° relative to the center of the rotary drum 3 so that magnetic gap portions thereof are projected from the outer rim of the rotary drum 3. The inductive magnetic heads 5a, 5b are set to opposite azimuth angles in order to effect azimuth recording on the magnetic tape 7.

The MR heads 6a, 6b are playback magnetic heads having MR elements as magnetically sensitive elements for detecting signals from the magnetic tape 7. The MR heads 6a, 6b are used for reproducing signals form the magnetic tape 7. The MR heads 6a, 6b are loaded on the rotary drum 3 to define an angle of 180° relative to the center of the rotary drum 3 so that magnetic gap portions thereof are projected from the outer rim of the rotary drum 3. The MR heads 6a, 6b are set to opposite azimuth angles in order to effect azimuth recording on the magnetic tape 7.

In the present magnetic recording/reproducing apparatus, the magnetic tape 7 is slid along the outer surface of the rotary drum device 1 to reproduce signals from the magnetic tape 7.

Referring to FIG. 2, the magnetic tape 7 is fed, during recording/reproduction, from a supply reel 11 through guide rolls 12, 13, so as to be coiled around the rotary drum device 1 for recording/reproduction. The magnetic tape 7, recorded or reproduced by the rotary drum device 1, is sent to a take-up roll 18 via guide rolls 14, 15 and capstans 16, 17. The magnetic tape 7 is fed under a preset tension and a preset speed by the capstan 16, run in rotation by the capstan motor 19, so as to be taken up on the take-up roll 18 via guide roll 17.

The rotary drum 3 is run in rotation by the motor 4 in the direction indicated by arrow A in FIG. 1. On the other hand, the magnetic tape 7 is fed for sliding obliquely relative to the stationary drum 2 and the rotary drum 3 along the reel guide unit 8 of the stationary drum 2. That is, the magnetic tape 7 is sent from the tape inlet side along the reel guide unit 8 of the stationary drum 2 in sliding contact with the stationary drum 2 and the rotary drum 3, along the tape running direction, in the direction indicated by arrow B in FIG. 1, so as to be then fed towards the tape output side, as indicated by arrow C in FIG. 1.

The internal structure of the rotary drum device 1 is explained with reference to FIG. 3.

Figure 3:
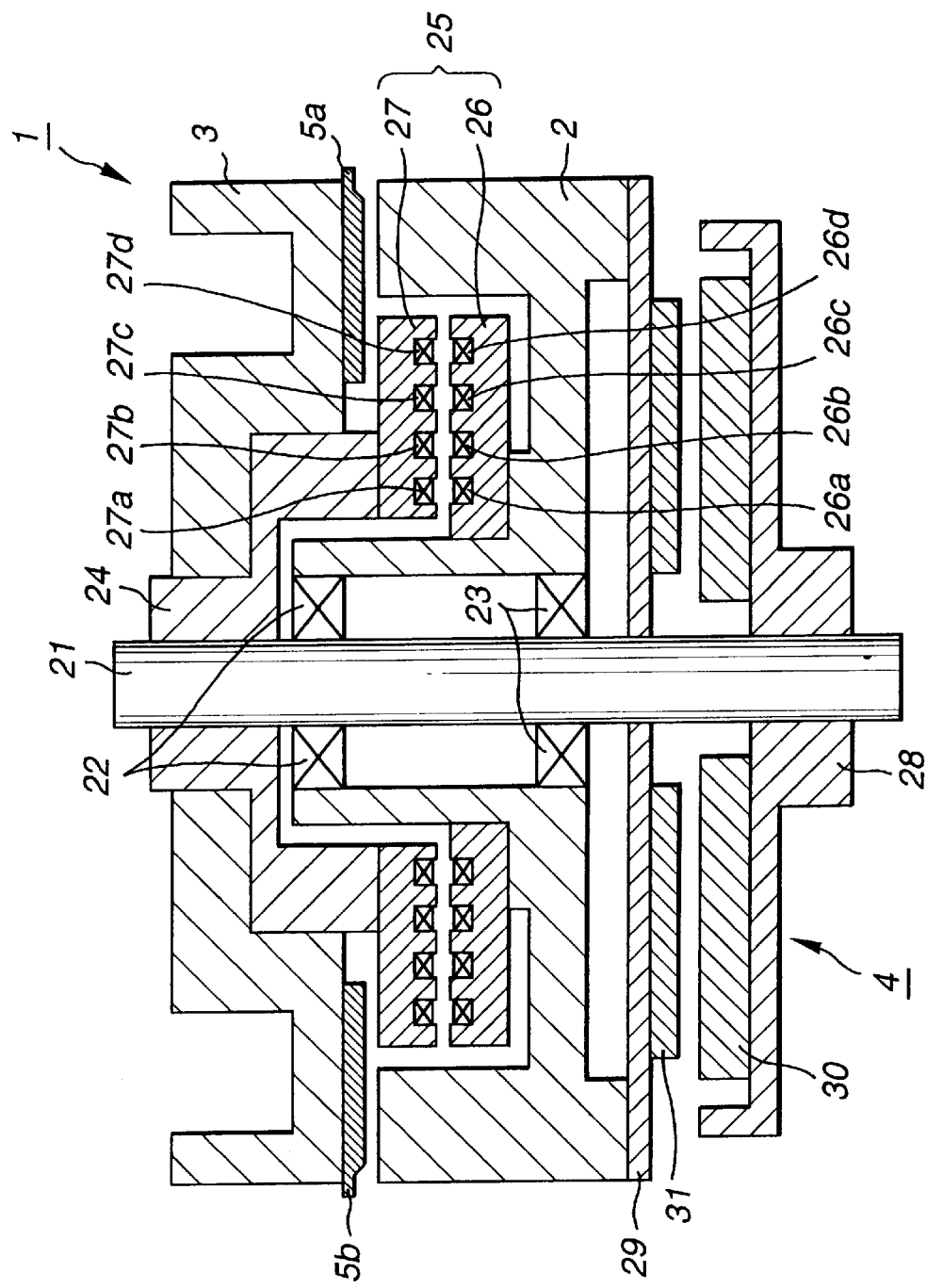
FIG. 3 is a circuit view showing an internal structure of the rotary drum device.

Referring to FIG. 3, a rotary shaft 21 is inserted at the center of the stationary drum 2 and the rotary drum 3. The drums 2, 3 and the rotary shaft 21 are formed of an electrically conductive material and are electrically connected to one another, with the stationary drum 2 being grounded, although not shown.

Within the inside of the sleeve of the stationary drum 2 are mounted a pair of bearings 22, 23, whereby the rotary shaft 21 is rotatably supported relative to the stationary drum 2. On the other hand, the rotary shaft 21 is rotatably supported by the bearings 22, 23 relative to the stationary drum 2. On the other hand, the inner rim of the rotary drum 3 is formed with a flange 24 secured to the upper end of the rotary shaft 21. Thus, the rotary drum 3 is adapted to be rotated with rotation of the rotary shaft 21.

Within the inside of the rotary drum device 1 is arranged a rotary transformer 25, which is a non-contact signal transmission device adapted for transmitting signals between the stationary drum 2 an the rotary drum 3. This rotary transformer 25 includes a stator core 26 mounted on the stationary drum 2 and a rotor core 27 mounted on the rotary drum 3.

The stator core 26 and the rotor core 27 are formed of a magnetic material, such as ferrite, and are formed by toroids centered about the rotary shaft 21. On the stator core 26, there are concentrically arranged a pair of rings for signal transmission 26a, 26b, associated with the paired inductive magnetic heads 5a, 5b, a ring for signal transmission 26c associated with the paired MR heads 6a, 6b, and a ring for power transmission 26d for supplying power necessary for driving the paired MR heads 6a, 6b. On the rotor core 27, there are similarly concentrically arranged a pair of rings for signal transmission 27a, 27b, associated with the paired inductive magnetic heads 5a, 5b, a ring for signal transmission 27c associated with the paired MR heads 6a, 6b, and a ring for power transmission 27d for supplying power necessary for driving the paired MR heads 6a, 6b.

These rings 26a, 26b, 26c, 26d, 27a, 27b, 27c, 27d are coils toroidally wound about the rotary shaft 21 as center, with the rings 26a to 26d of the stator core 26 facing the rings 27a to 27d of the rotor core 27. The rotary transformer 25 is configured for transmitting signals or the power in a non-contact fashion between the rings 26a to 26d of the stator core 26 and the rings 27a to 27d of the rotor core 27.

On the rotary drum device 1 is mounted a motor 4 for rotationally driving the rotary drum 3. This motor 4 has a rotor 28 as a rotary portion and a stator 29 as a stationary portion. The rotor 28 is mounted on the lower end of the rotary shaft 21 and includes a driving magnet 30. On the other hand, the stator 29 is mounted on the lower end of the stationary drum 2 and includes a driving coil 31. The rotor 28 is rotationally driven by the current being supplied to the driving coil 31. This rotates the rotary shaft 21 mounted on the rotor 28 to cause rotation of the rotary drum 3 secured to the rotary shaft 21.

Figure 4:
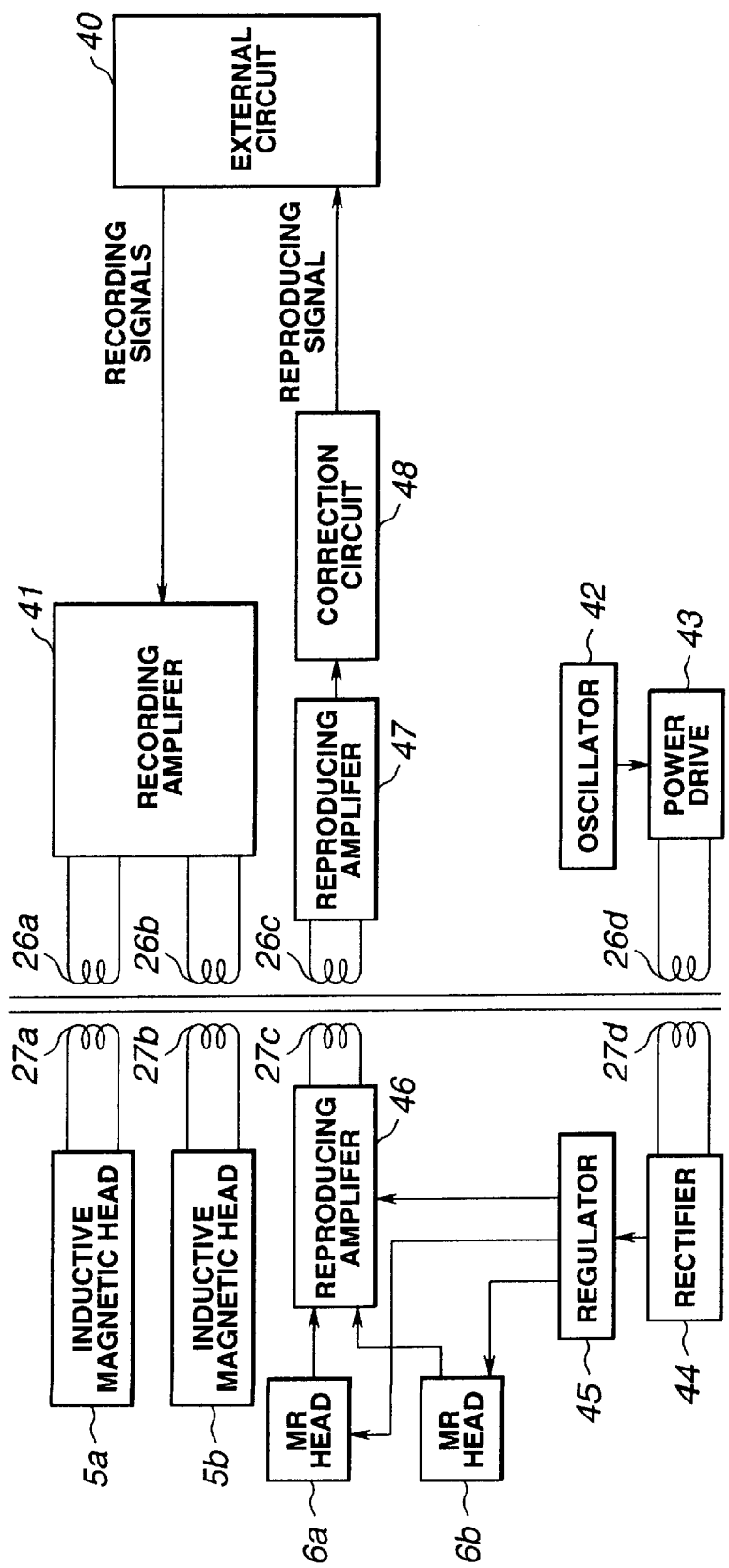
FIG. 4 is a schematic view showing the circuit structure of the rotary drum device and its peripheral circuit.

The recording/reproduction by the above-described rotary drum device 1 is explained with reference to FIG. 4 schematically showing the circuit structure of the rotary drum device 1 and its peripheral circuit.

For recording signals on the magnetic tape 7 using the rotary drum device 1, the current is first fed to the driving coil 31 of the motor 4 for rotationally driving the rotary drum 3. While the rotary drum 3 is being run in rotation, recording signals from an external circuit 40 are sent to a recording amplifier 41, as shown in FIG. 4.

The recording amplifier 41 amplifies the recording signals from the external circuit 40 to route the recording signals to the ring for signal transmission 26a of the stator core 26, associated with the inductive magnetic head 5a at a timing of recording signals by the inductive magnetic head 5a, while routing the recording signals to the ring for signal transmission 26b of the stator core 26, associated with the remaining inductive magnetic head 5b, at a timing of recording signals by the inductive magnetic head 5b.

The paired inductive magnetic heads 5a, 5b are arranged at an angle of 180° relative to each other with respect to the center of the rotary drum 3, as described above. Thus, these inductive magnetic heads 5a, 5b alternately record signals with a phase difference of 180°. The recording amplifier 41 switches between the timing of supplying recording signals to the inductive magnetic head 5a and the timing of supplying recording signals to the inductive magnetic head 5b with a phase difference of 180°.

The recording signals, sent to the ring for signal transmission 26a of the stator core 26, associated with the inductive magnetic head 5a, are transmitted in a contact-free fashion to the ring for signal transmission 27a of the rotor core 27. The recording signals, transmitted to the ring for signal transmission 27a of the rotor core 27, are sent to the inductive magnetic head 5a which then records the signals on the magnetic tape 7.

Similarly, the recording signals, sent to the ring for signal transmission 26b of the stator core 26 associated with the inductive magnetic head 5b, are transmitted in a contact-free fashion to the ring for signal transmission 27b of the rotor core 27. The recording signals, transmitted to the ring for signal transmission 27b of the rotor core 27, are sent to the inductive magnetic head 5b which then records the signals on the magnetic tape 7.

For reproducing signals from the magnetic tape 7, using the rotary drum device 1, the current is first fed o the driving coil 31 of the motor 4 to run the rotary drum 3 in rotation. With the rotary drum 3 being run in rotation, the high frequency current is sent from an oscillator 42 to a power driver 43.

The high frequency current from the oscillator 42 is converted by a power drive 43 to a pre-set ac current which is sent to the ring for signal transmission 26d of the stator core 26. The ac current, transmitted to the ring for signal transmission 27c of the rotor core 27, is rectified by a rectifier 44 to a dc current which is sent to a regulator 45 so as to be thereby set to a pre-set voltage.

The current set to the pre-set voltage by the regulator 45 is sent as the sense current to the paired MR heads 6a, 6b. To these MR heads 6a, 6b is connected a reproducing amplifier 46 adapted for detecting the signals from the MR heads 6a, 6b. The current from the regulator 45 is also sent to this reproducing amplifier 46.

The MR heads 6a, 6b each include a MR element whose resistance is changed with the magnitude of the external magnetic field. With the MR heads 6a, 6b, the resistance value of the NR element is changed by the signal magnetic field from the magnetic tape 7 so that the voltage changes are induced in the sense current.

The reproducing amplifier 46 detects the voltage changes to output signals proportionate to the voltage changes as playback signals.

The paired MR heads 6a, 6b are arranged at an angle of 180° relative to each other with respect to the center of the rotary drum 3, as described above. Thus, these MR heads 6a, 6b alternately record signals with a phase difference of 180°. The playback amplifier 46 switches between the timing of outputting the playback signals from the MR head 6a and the timing of outputting the playback signals from the MR head 6b with a phase difference of 180°.

The playback signals from the reproducing amplifier 46 are sent to the ring for signal transmission 27c of the rotor core 27 and thence transmitted in a contact-free fashion to the ring for signal transmission 26c of the stator core 26. The playback signals transmitted to the ring for signal transmission 26c of the stator core 26 are amplified by a reproducing amplifier 47 and thence supplied to a correction circuit 48. The playback signals are corrected in a pre-set manner by the correction circuit 48 so as to be outputted to the external circuit 40.

Meanwhile, in the circuit configuration shown in FIG. 4, the paired inductive magnetic heads 5a, 5b, paired MR heads 6a, 6b, rectifier 44, regulator 45 and the reproducing amplifier 46 are loaded on the rotary drum 3 so as to be rotated with the rotary drum 3. The recording amplifier 41, oscillator 42, power drive 43, reproducing amplifier 47 an the correction circuit 48 are arranged on a stationary portion of the rotary drum device 1 or are arranged as an external circuit separate from the rotary drum device 1.

The MR heads 6a, 6b, loaded on the rotary drum 3, are explained in detail with reference to FIG. 5. The MR heads 6a, 6b are constructed similarly to each other except that the azimuth angles are opposite to each other. Therefore, in the following description, these MR heads 6a, 6b are referred to collectively as a MR head 6.

The MR head 6 is a read-only magnetic head loaded on the rotary drum 3 and which is adapted to detect signals from the magnetic tape 7 by exploiting the magneto-resistive effect. In general, the MR head has a sensitivity and a playback output larger than those of the inductive magnetic head which performs recording/reproduction by exploiting the electromagnetic induction. Thus, the MR head is suited to high density recording. Thus, a higher recording density can be realized by using the MR head 6 as the reproducing magnetic head.

Figure 5:
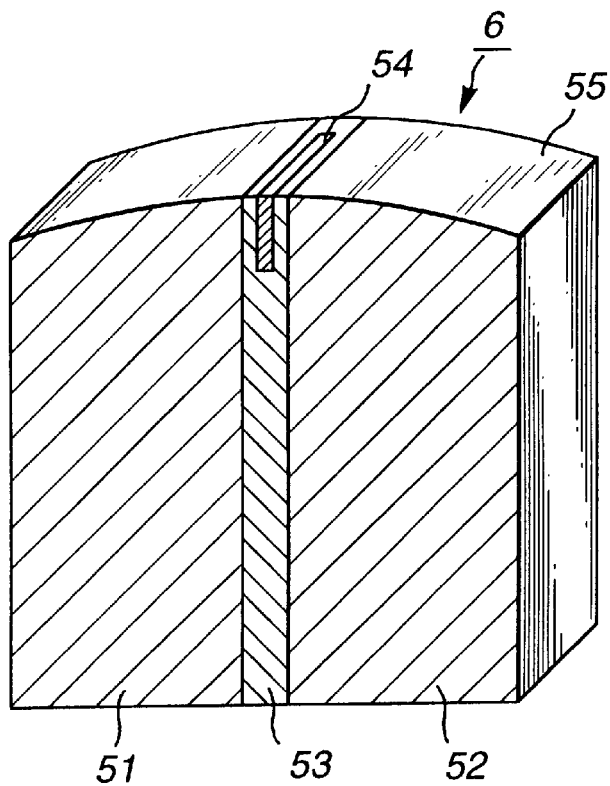
FIG. 5 is a perspective view showing an example of a MR head loaded on the rotary drum, with a portion thereof being cut away.

This MR head 6 has a pair of magnetic shields 51, 52, formed of a soft magnetic material, such as N—Zn ferrites, and a substantially rectangular MR element unit 54, sandwiched between paired magnetic shields 51, 52 via an insulator 53, as shown in FIG. 5. From both ends of the MR element unit 54 are derived a pair of terminals, via which the sense current can be supplied to the MR element unit 54.

The MR element unit 54 is made up of a MR device exhibiting magneto-resistive effect a soft adjacent layer (SAL) film and an insulating film interposed between the MR element and the SAL film. The MR device 6, SAL film and the insulating films are layered together. The MR device is formed of a soft magnetic material, such as Ni—Fe, whose resistance value is changed with the strength of the external magnetic field. The SAL film is used to apply the bias magnetic field in accordance with the so-called bias system, and is made up of a magnetic material of low coercivity and high magnetic permeability, such as Permalloy. The insulating film is used to insulate the MR device and the SAL film from each other to prohibit electrical current division loss and is formed of an insulating material, such as Ta.

This MR element unit 54 is substantially rectangular in profile and is sandwiched between a pair of magnetic shields 51, 52, with an insulator 53 in-between, so that the MR element unit 54 has its one side exposed to a magnetic tape sliding surface 55. Specifically, the MR element unit 54 is sandwiched between the paired magnetic shields 51, 52, with the insulator 53 in-between, so that its short-axis direction is substantially perpendicular to the magnetic tape sliding direction and so that its long-axis will be substantially perpendicular to the magnetic tape sliding direction.

The magnetic tape sliding surface 55 of the MR head 6 is ground to a cylindrical surface, along the sliding direction of the magnetic tape 7, so that the MR element unit 54 has its lateral side exposed to the magnetic tape sliding surface 55. The magnetic tape sliding surface 55 is also ground to a cylindrical surface along the sliding direction of the magnetic tape 7. Thus, the MR head 6 is protruded most significantly at the MR element unit 54 or its near-by portion. By having the MR element unit 54 or its near-by portion protruded most significantly, the MR element unit 54 can be improved in its abutting characteristics with respect to the magnetic tape 7.

Figure 6:
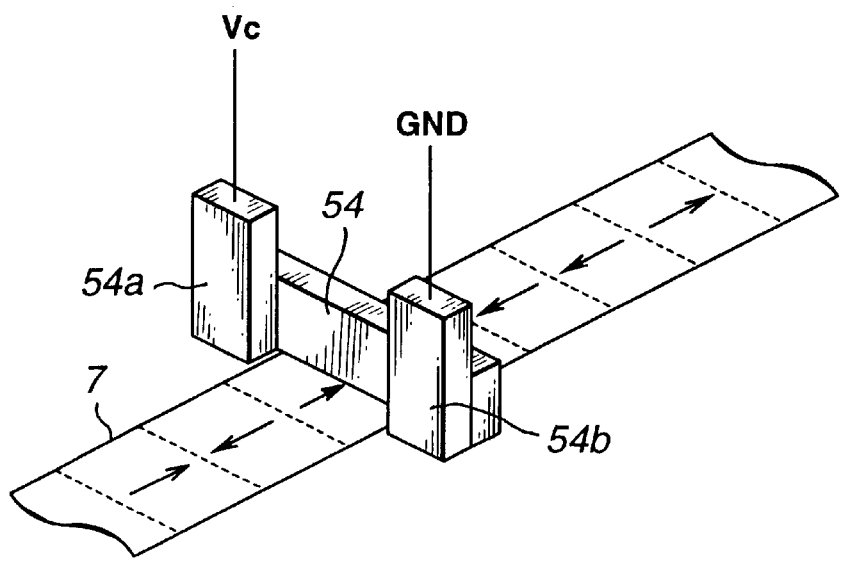
FIG. 6 is a schematic view showing how signals from a magnetic tape are reproduced using a MR head.

For reproducing signals from the magnetic tape 7, using the above-described MR head 6, the magnetic tape 7 is slid along the MR element unit 54, as indicated in FIG. 6, in which an arrow schematically indicates the manner of magnetization of the magnetic tape 7.

With the magnetic tape 7 this slid against the MR element unit 54, the sense current is fed to the MR element unit 54, via terminals 54a, 54b connected to both ends of the MR element unit 54, to detect changes in voltage of the sense current. Specifically, a pre-set voltage VC is applied at the terminal 54a connected to one end of the MR element unit 54. The terminal 54, connected to the opposite end of the MR element unit 54, is connected to the rotary drum 3. the rotary drum 3 is electrically connected via rotary shaft 21 to the stationary drum 2, while the stationary drum 2 is grounded, in a manner not shown. Thus, the terminal 54b, connected to the MR element unit 54, is grounded via the rotary drum 3, rotary shaft 21 and the stationary drum 2.

If, as the magnetic tape 7 is slid, the sense current is sent to the MR element unit 54, the resistance value of the MR device formed in the MR element unit 54 is changed to produce voltage changes in the sense current. By detecting the voltage change in the sense current, the signal magnetic field from the magnetic tape 7 is detected to reproduce signals recorded on the magnetic tape 7.

In the MR head 6 used in the present invention, it suffices if the MR device formed in the MR element unit 54 is a device exhibiting the magneto-resistive effect. For example, a so-called giant magneto-resistive effect device (GNR device), exhibiting a higher magneto-resistive effect by layering plural thin films, may be used. The technique of applying the bias magnetic field across the MR device need not be the SAL bias system, since a variety of techniques, such as permanent magnet bias system, a shunt current bias system, a self-bias system, an exchange bias system, a barber pole system, a split device system or a servo bias system, may be used. The giant magneto-resistive effect and the various bias systems are explained in detail in, for example, "Magneto-resistive Head—Its Fundamentals and Application, translated by K. Hayash", published by Maruzen Co. Ltd.

The magnetic tape 7, used in the magnetic recording/reproducing apparatus having the rotary drum device 1 as described above will be hereinafter explained.

Figure 7:
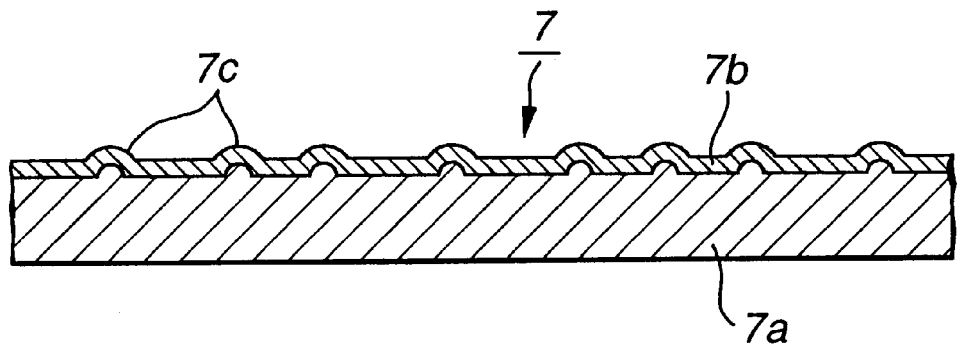
FIG. 7 is a cross-sectional view showing a typical magnetic tape embodying the present invention.

The magnetic tape 7 includes a non-magnetic substrate 7a, comprised of a plastics film wound in a tape, and a magnetic layer 7b formed thereon, as shown in FIG. 7.

The magnetic layer 7b of the magnetic tape 7 contains an electrically conductive material so that its surface resistance to current conduction is on the order of 1-k$\Omega$ or less. In general, a material having the surface resistance to current conduction not higher than approximately 100 k$\Omega$ is termed an electrically conductive material. With an electrically conductive material, having a lower surface resistance to current conduction, static charges are scarcely produced on its surface.

As a material for the magnetic layer 7b, a metal magnetic material is preferred. Specifically, the magnetic layer 7b is formed by depositing a ferromagnetic metal material, such as Co, CO—Cr, Co—Ni, Co—Fe—Ni or Co—Ni—Cr by deposition techniques such as vacuum vapor deposition, sputtering or ion plating, on the non-magnetic substrate 7a. This gives the magnetic layer 7b containing an electrically conductive material and which has a sufficient small surface resistance to current conduction.

On the surface of the magnetic tape are formed a large number of micro-sized projections 7c. For forming these numerous micro-sized projections 7c, a large number of micro-sized projections are previously formed on the surface of the nonmagnetic substrate 7a and the magnetic layer 7b is then formed thereon. This gives a large number of micro-sized projections 7c on the surface of the magnetic tape 7, that is on the surface of the magnetic layer 7b.

Among the methods of forming a large number of micro-sized projections on the surface of the non-magnetic substrate 7a, there are a method of dispersing fillers of a pre-set size in the starting material for the non-magnetic substrate 7a and aggregating the filler to a pre-set density at the time of manufacturing the non-magnetic substrate 7a to relieve it on the surface of the non-magnetic substrate 7a to provided an irregular surface of the non-magnetic substrate 7a, and a method of dispersing fine particles of a pre-set particle size on the non-magnetic substrate 7a to fix it such as with a binder resin.

Meanwhile, it is unnecessary for the magnetic tape 7 of the present invention to be constituted solely by the non-magnetic substrate 7a and the magnetic layer 7b. That is, the magnetic layer 7b may be formed on an undercoat previously formed on the non-magnetic substrate 7a, or a back-coat layer may be formed on the back side of the non-magnetic substrate 7a. If the surface resistance to current conduction is sufficiently small, the magnetic layer 7b need not be limited to the above-described structure. For example, the magnetic layer 7b may be of a dual structure for improving the electromagnetic conversion characteristics.

Next, signal reproduction from the magnetic tape 7 by the MR head 6 loaded on the rotary drum device 1 is explained in further detail.

The MR head has already been commercialized as a hard disc drive etc. In the conventional hard disc drive, a MR head is loaded on a floating slider and signal reproduction is performed with the MR head being floated above the magnetic disc. If the MR head 6 is slid on the magnetic tape 7, a number of problems, not encountered in conventional hard disc drive, are met. The present invention is aimed at obviating the problem caused on sliding the MR head 6 on the magnetic tape 7.

For reproducing signals from the magnetic tape 7 by the MR head 6, the MR head 6 is slid obliquely relative to the magnetic tape 7, as described above. At this time, the MR element unit 54 is positioned at the distal end of the MR head 6 and is slid in perpetual contact with the magnetic tape 7.

The MR device formed on the MR element unit 54 is electrically conductive and is destructed if excess current flows therethrough. If, when the MR head 6 is in contact with the magnetic tape 7, static charges are accumulated on the magnetic tape 7 such that the static charges are discharged, the MR device is destructed by so-called static destruction.

Thus, in the rotary drum device 1 embodying the present invention, the terminal 54b, connected to the MR element unit 54, is grounded via the rotary drum 3, rotary shaft 21 and the stationary drum 2. If, with the rotary drum device 1, static electricity is discharged, any excess current produced on discharge is allowed to exit efficiently via the rotary drum 3, rotary shaft 21 and the stationary drum 2. This renders difficult the destruction of the MR device by static destruction.

The present invention also employs the magnetic tape 7 containing the electrically conductive material as the magnetic layer 7b as the recording medium. The magnetic tape 7, containing the electrically conductive material in its magnetic layer 7b, is less susceptible to discharging of static electricity because the magnetic tape 7 can hardly accumulate the static electricity. Thus, according to the present invention, destruction of the MR head 6 is not liable to be produced.

Figure 8:
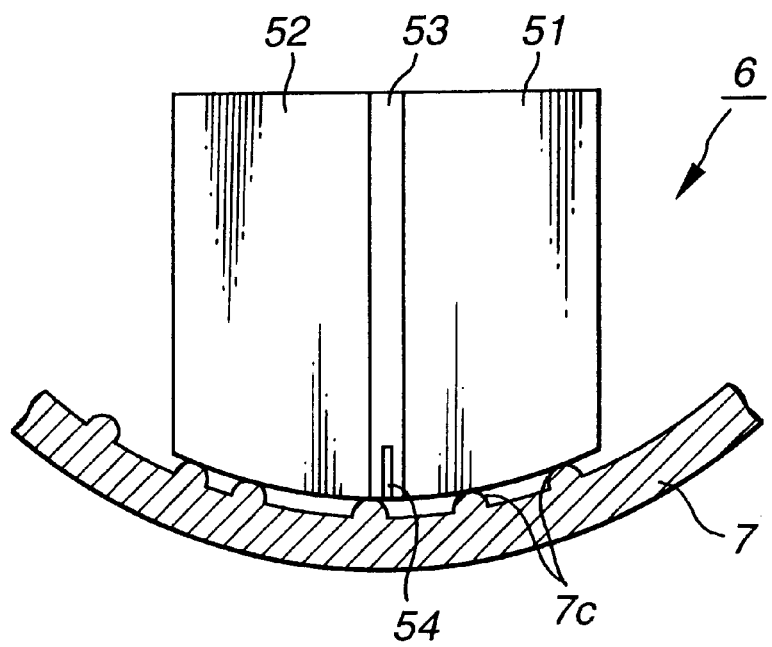
FIG. 8 is a schematic view showing the state of contact between the magnetic tape and the MR head.

However, if the magnetic tape 7 containing the electrically conductive material in its magnetic layer 7b, the sense current, which should flow through the MR device of the MR element unit 54, flows in the magnetic tape 7, thus possibly producing electrical shorting. Specifically, the sense current flowing through the magnetic tape 7 tends to produce shorting across the terminals 54a and 54b connected to the MR element unit 54, that across the terminal 54a or 54b connected to the MR element unit 54 and the MR device formed in the MR element unit 54 or that across the MR devoice and the SAL film. Such shorting leads to the absence of an output of the playback signals to produce so-called dropout, thus, the present invention uses the magnetic tape 7 having plural projections 7c on its surface as a recording medium. If the magnetic tape 7 having numerous projections 7c on its surface is used, the contact state between the magnetic tape 7 and the MR head 6 is shown in FIG. 8. that is, the magnetic tape 7 and the MR head 6 are contacted only at the micro-sized projections 7c so that the real contact area between the magnetic tape 7 and the MR head 6 is extremely small. The aforementioned shorting then is not likely to be produced. That is, according to the present invention, the real contact area between the magnetic tape 7 and the MR head 6 is reduced to an extremely small value, by the provision of the numerous micro-sized projections 7c, thereby prohibiting the occurrence of the shorting.

What is claimed is:

1. A magnetic recording/reproducing apparatus for reproducing signals by a helical scan system from a magnetic tape having a magnetic layer formed on a non-magnetic substrate thereof, comprising:

a magneto-resistive effect magnetic head for reproducing signals from said magnetic tape; and a rotary drum carrying said magneto-resistive effect magnetic head;

said magnetic tape being such a magnetic tape having a large number of projections on the tape surface and containing an electrically conductive material in the magnetic layer.

2. The magnetic recording/reproducing apparatus according to claim 1 wherein the magnetic layer of said magnetic tape has surface resistance to current conduction not higher than 100 kΩ.

3. The magnetic recording/reproducing apparatus according to claim 1 wherein the magneto-resistive effect magnetic head includes a magneto-resistive effect device as a magnetically sensitive device for detecting signals from said magnetic tape, and wherein one of terminals derived from said magneto-resistive effect device is connected to said rotary drum.

4. The magnetic recording/reproducing apparatus according to claim 3 further comprising:

a stationary drum arranged so that its center axis is coincident with that of the rotary drum;

said rotary drum being electrically connected to said stationary drum.

5. A magnetic tape used in a magnetic recording/reproducing apparatus adapted for reproducing signals in accordance with a helical scan system using a magneto-resistive effect magnetic head, comprising:

a tape-shaped non-magnetic substrate; and a magnetic layer formed on said non-magnetic substrate and containing an electrically conductive material;

there being formed a large number of projections on a surface of the tape facing the magneto-resistive effect magnetic head.

6. The magnetic tape according to claim 5 wherein the surface resistance to current conduction of said magnetic layer is not larger than 100 kΩ.

* * * * *